United States Patent [19]

Roovers et al.

[11] Patent Number: 5,062,984

[45] Date of Patent: Nov. 5, 1991

[54] POLYMER MIXTURE WHICH COMPRISES AN AROMATIC POLYCARBONATE AND A POLYALKYLENE TEREPHTHALATE, AND ARTICLES FORMED THEREFROM

[75] Inventors: Wilhemus M. M. Roovers, Steenbergen, Netherlands; Jan de Boer, Verderel les Sauqueuse, France

[73] Assignee: General Electric Company, Pittsfield, Mass.

[21] Appl. No.: 455,124

[22] Filed: Dec. 22, 1989

[30] Foreign Application Priority Data

Dec. 27, 1988 [NL] Netherlands .......................... 8803173

[51] Int. Cl.$^5$ ........................ C08L 69/00; C08L 67/02
[52] U.S. Cl. ...................................... 525/67; 525/133; 525/147; 525/148
[58] Field of Search .................. 524/145; 525/67, 133, 525/147, 148, 176, 439

[56] References Cited

U.S. PATENT DOCUMENTS

| | | | |
|---|---|---|---|
| 3,169,121 | 2/1965 | Goldberg | 528/173 |
| 3,864,428 | 2/1975 | Nakamura et al. | 525/67 |
| 4,000,216 | 12/1976 | Lang | 260/857 UN |
| 4,001,184 | 1/1977 | Scott | 528/182 |
| 4,044,073 | 8/1977 | Baron et al. | 260/860 |
| 4,125,572 | 11/1978 | Scott | 260/860 |
| 4,131,575 | 12/1978 | Adelmann et al. | 260/17.4 R |
| 4,148,842 | 4/1979 | Yu et al. | 260/873 |
| 4,180,494 | 12/1979 | Fromuth et al. | 260/40 R |
| 4,320,207 | 3/1982 | Watanabe | 525/176 |
| 4,587,272 | 5/1986 | Avakian et al. | 521/86 |
| 4,652,607 | 3/1987 | Stix et al. | 525/67 |
| 4,656,227 | 4/1987 | Lindner et al. | 525/133 |
| 4,657,973 | 4/1987 | Endo et al. | 527/67 |
| 4,746,703 | 5/1988 | Dallmann | 525/148 |
| 4,866,123 | 9/1989 | Wittmann | 525/67 |
| 4,927,870 | 5/1990 | Ogoe | 524/141 |

FOREIGN PATENT DOCUMENTS

| | | |
|---|---|---|
| 1049185 | 2/1979 | Canada . |
| 0114605 | 8/1984 | European Pat. Off. . |
| 0162382 | 11/1985 | European Pat. Off. . |
| 0207359 | 1/1987 | European Pat. Off. . |
| 2439542 | 3/1975 | Fed. Rep. of Germany . |
| 3234174 | 3/1984 | Fed. Rep. of Germany . |
| 8300491 | 2/1983 | PCT Int'l Appl. . |
| 1569296 | 6/1980 | United Kingdom . |

OTHER PUBLICATIONS

Chemical Abstracts, vol. 81, p. 43, 14305n (1974)–Poly-carbonate blends with a pearl-like gloss. (NAWA et al.)

Primary Examiner—John C. Bleutge
Assistant Examiner—David Buttner
Attorney, Agent, or Firm—William F. Mufatti

[57] ABSTRACT

The invention relates to polymer mixtures comprising A. an aromatic polycarbonate and B. a polyalkylene terephthalate. It has been found that the cosmetic properties of articles obtained by injection-moulding the polymer mixture can be improved by the addition of cross-linked polymer particles having an average particle size from 1 to 30 micrometers.

17 Claims, No Drawings

POLYMER MIXTURE WHICH COMPRISES AN AROMATIC POLYCARBONATE AND A POLYALKYLENE TEREPHTHALATE, AND ARTICLES FORMED THEREFROM

The invention relates to a polymer mixture which comprises A. an aromatic polycarbonate and B. a polyalkylene terephthalate. The invention also relates to a method of preparing such polymer mixtures and to articles formed from the polymer mixture according to the invention.

Polymer mixtures which comprise A. an aromatic polycarbonate and B. a polyalkylene terephthalate are generally known.

The known polymer mixtures have a good combination of properties. The appearance of articles obtained from these polymer mixtures by injection-moulding sometimes shows some defects: for example, flow lines and stripes.

It has been found that this detrimental property can be avoided by incorporating in the polymer mixture a third constituent C. in the form of cross-linked polymer particles having an average particle size from 1 to 30 microns. In the presence of the particles just mentioned the disadvantage mentioned hereinbefore does not occur or occurs to a far lesser extent.

The cross-linked polymer in constituent C. preferably comprises units derived from styrene or from a styrene compound substituted in the ring, from one or more $C_4$-$C_8$ (meth)alkylacrylates and a cross-linking agent.

It is possible and sometimes it is to be preferred to use the cross-linked polymer particles while dispersed in a carrier polymer.

The polymer mixture according to the invention may comprise as a further constituent a flame-retardant, for example, a copolymer of brominated bisphenol A, bisphenol and phosgene having a weight-averaged molecular weight of less than 3,000.

As a further constituent the polymer mixture according to the invention may comprise a phosphate. Phosphates improve the processability of the polymer mixture (reduction of viscosity) and have a flame-retarding activity.

The phosphate may replace the above-mentioned flame-retardant partly (for example, up to at most 50% by weight of the flame-retardant). However, although entire replacement of the flame-retardant by phosphates leads to good flame-retarding properties, it also results in a deterioration of the remaining properties.

The polymer mixture according to the invention may further comprise any conventionally used additives, for example:
a. an agent to improve the impact strength, and/or
b. a polyolefin, and/or
c. one or more stabilisers, and/or
d. dyes and/or pigments, and/or
e. reinforcing fibres, and/or
f. a mould-release agent.

The composition of the polymer mixture according to the invention is preferably such that it comprises per 100 parts by weight of the constituents A+B+C
63-86 parts by weight of aromatic polycarbonate,
12-17 parts by weight of polyalkylene terephthalate, and
2-20 parts by weight of the cross-linked polymer particles.

The polymer mixture according to the invention comprises at any rate one or more of the following constituents:
A. an aromatic polycarbonate
B. a polyalkylene terephthalate
C. cross-linked polymer particles having an average particle size from 1 to 30 microns.

A. AROMATIC POLYCARBONATE

Aromatic polycarbonates are polymers known per se. They are generally prepared by reacting a dihydric phenol compound with a carbonate precursor, for example, phosgene, a halogen formate or a carbonate ester. Aromatic polycarbonates are polymers which comprise units of the formula

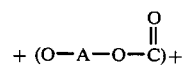

wherein A is a bivalent aromatic radical derived from the dihydric phenol used in the preparation of the polymer. Mononuclear or polynuclear aromatic compounds which comprise two hydroxy radicals each directly bonded to a carbon atom of an aromatic nucleus may be used as dihydric phenols in the preparation of the aromatic polycarbonates.

The known branched polycarbonates as described, for example, in U.S. Pat. No. 4,001,184 are also suitable.

Suitable aromatic polycarbonates are also the so-called polyester carbonates which are obtained by performing the polymerisation reaction in the presence of an ester precursor, for example, a difunctional carboxylic acid, for example, terephthalic acid or an ester-forming derivative thereof. These polyester carbonates have ester compounds and carbonate compounds in the polymeric chain. Polyester carbonates are described, for example, in U.S. Pat. No. 3,169,121.

B. POLYALKYLENE TEREPHTHALATE

Polyalkylene terephthalate is to be understood to mean herein the condensation products of one or more diol compounds and terephthalic acid or a mixture of terephthalic acid and other dicarboxylic acids. Suitable diol compounds are, for example, ethanediol, butanediol, hexanediol, cyclohexanedimethanol, diethylene glycol, triethylene glycol and etherdiol compounds of the general formula

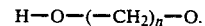

Up to 20 mol % of the diol compound may be replaced in the polyalkylene terephthalates which may be used in the polymer mixtures according to the invention by, for example, aromatic diol compounds and/or unsaturated diol compounds and/or tri-ol or tetra-ol compounds. Up to 20 mol % of the terephthalic acid may be replaced by other dicarboxylic acids, for example, aliphatic dicarboxylic acids, for example, adipic acid, 1,4-cyclohexane dicarboxylic acid.

The polyalkylene phthalate esters the alkylene units of which are derived for more than 80 mol % from 1,4-butanediol and the phthalate units of which are derived for more than 80 mol % from terephthalic acid, are particularly suitable for the polymer mixtures according to the invention. Polybutylene terephthalate esters having an intrinsic viscosity from 0.7 to 2.0, preferably from 0.7 to 1.5 dl/g (measured in a 60/40 mixture of phenol/tetrachloroethane at 25° C.) are suitable.

Copolyesters derived from a diol consisting of 1,4-cyclohexanedimethanol and/or ethylene glycol and from terephthalic acid or a mixture of isophthalic acid and terephthalic acid are also suitable.

It is further possible to use a mixture of two or more polyalkylene terephthalates.

C. CROSS-LINKED POLYMER PARTICLES

The polymer mixture according to the invention should further comprise cross-linked polymer particles having an average particle size from 1 to 30 microns. Such particles and their preparation are known from DE-A-2439542. These known polymer particles are used to reduce the gloss of articles formed from polymers. PVC, ABS, MBS, PET, PE, PP, polycarbonate, polyalkylmethacrylate, polyurethane, polystyrene or also mixtures of these or other polymers are mentioned by way of example in DE-A-2439542.

It has now been found that the above-meant detrimental cosmetic effect which may occur in polycarbonate-polyalkylene terephthalate mixtures can be avoided or at least be reduced by using the known polymer particles.

As polymer particle C. are preferably used particles which comprise units derived from styrene or from a styrene compound substituted in the ring, from a $C_4$–$C_8$ alkylacrylate and a cross-linking agent. The particles may be used in the form of a phase dispersed in a polymeric carrier.

In addition to the constituents A, B. and C. mentioned hereinbefore the polymer mixture according to the invention may comprise many other constituents.

By adding a flame-retardant, a polymer mixture having flame-retarding properties is obtained. As flame-retardants may be used any compounds known as such which are suitable for incorporation in polymer mixtures. The copolymers of brominated bisphenol A, bisphenol and phosgene having a weight-averaged molecular weight of less than 3,000 are particularly suitable.

The polymer mixture according to the invention is preferably composed so that the polymer mixture comprises per 100 parts by weight of A+B+C 63–86 parts by weight of aromatic polycarbonate, 12–17 parts by weight of polyalkylene terephthalate, and 2–20 parts by weight of the cross-linked polymer particles.

A weight ratio of the aromatic polycarbonate to the polyalkylene terephthalate from 90:10 to 80:20 is preferably used, even more preferably from 86:14 to 84:16.

The polymer mixture according to the invention may be prepared according to known methods, for example, by mixing the constituents with each other in the melt. The constituents are preferably compounded in an extruder.

EXAMPLES

In the examples the following constituents were used.
PC: an aromatic polycarbonate derived from bisphenol A and phosgene, having an intrinsic viscosity of 49 ml/g, measured in methylene chloride at 25° C.
PBT: a polybutylene terephthalate having an intrinsic viscosity of 86 ml/g, measured in a 60/40 phenol/tetrachloroethane mixture at 25° C.
PD: polymeric particles having a diameter of 1–30 microns, built up from units derived from approximately 29% of methyl methacrylate, approximately 34% of butyl acrylate and approximately 36% of styrene and 1% by weight of remaining constituents.
IM: an agent to improve the notched impact strength of the core-shell type having a core built up substantially from polybutadiene and a shell built up substantially from methyl methacrylate and styrene.
PE: polyethylene
ST: a mixture of conventionally used stabilisers
P: pigments
C: soot
T: titanium dioxide
R: a conventionally used mould-release agent
FR1: copolymer of brominated bisphenol A, bisphenol and phosgene having a molecular weight of approximately 2,500.
T: polytetrafluoroethylene.

The constituents were compounded in a extruder adjusted at an average adjusting temperature of 235° C. in the quantities as recorded in the table hereinafter. The resulting extrudate was chopped up to pellets. Test pieces were manufactured (by injection moulding) from the pellets to determine the notched impact value, according to Izod, and the gloss. The gloss was determined according to ASTM D 523-85, at an angle of 60°. To determine the cosmetic properties, large pieces of approximately 300 g were injection-moulded in the form of car bumpers terminating members. The method of double gated injection moulding was used. The resulting surface was evaluated visually. The evaluation runs from +=clearly visible flowlines and strips to +++++=absolutely no visible flowlines and/or stripes.

The results obtained are also recorded in the table hereinafter.

|  | Example No. | | | | |
| --- | --- | --- | --- | --- | --- |
|  | A | I | II | B | III |
| Composition (parts by weight) | | | | | |
| PC | 77.4 | 72.4 | 64.4 | 67.1 | 62.1 |
| PBT | 15 | 15 | 15 | 15 | 15 |
| PD | — | 5 | 10 | — | 5 |
| IM | 4 | 4 | 7 | 5 | 5 |
| PE | 2 | 2 | 2 | — | — |
| ST | 0.6 | 0.6 | 0.6 | 0.6 | 0.6 |
| P | — | — | — | 0.15 | 0.15 |
| C | 1 | 1 | 1 | — | — |
| T | — | — | — | 1.6 | 1.6 |
| R | — | — | — | 0.3 | 0.3 |
| FR1 | — | — | — | 10 | 10 |
| T | — | — | — | 0.25 | 0.25 |
| Properties | | | | | |
| Notched impact value (J/m) | 650 | 570 | 470 | 563 | 150 |
| Gloss 60 (%) | 100 | 60 | 45 | 100 | 70 |
| Cosmetic properties | + | +++ | ++++ | + | +++ |

We claim:

1. A polymer mixture which comprises A. an aromatic polycarbonate and B. a polyalkylene terephthalate, characterised in that the polymer mixture comprises C. cross-linked polymer comprising units derived from styrene or from a styrene compound substituted in the ring, from one or more $C_4$–$C_8$ alkyl-(meth)acrylates and from a cross-linking agent, the cross-linked polymer particles having an average particle size from 1 to 30 microns.

2. A polymer mixture as claimed in claim 1, characterised in that the cross-linked polymer particles are dispersed in a carrier polymer.

3. A polymer mixture as claimed in claim 1, characterised in that the polymer mixture comprises a flame-retardant as a further constituent.

4. A polymer mixture as claimed in claim 1, characterised in that the polymer mixture comprises as a flame-retardant a copolymer of brominated bisphenol A, bisphenol and phosgene having a weight-averaged molecular weight of less than 3,000.

5. A polymer mixture as claimed in claim 1, characterised in that the polymer mixture comprises as a further constituent an additive selected from the group consisting of:
   a. an agent to improve the impact strength,
   b. a polyolefin,
   c. one or more stabilizers,
   d. dyes,
   e. pigments,
   f. reinforcing fibres,
   g. a mould-release agent and
   h. mixtures thereof.

6. A polymer mixture as claimed in claim 1, characterised in that the polymer mixture comprises per 100 parts by weight of A+B+C
63-86 parts by weight of aromatic polycarbonate
12-17 parts by weight of polyalkylene terephthalate, and
2-20 parts by weight of the cross-linked polymer particles.

7. The article of claim 1 wherein the polyalkylene terephthalate is polybutylene terephthalate and the polymeric particles having a diameter of about 1-30 microns comprise about 29% by weight methyl methacrylate, about 34% by weight butyl acrylate and about 36% by weight styrene.

8. A polymer mixture as claimed in claim 1 characterised in that the polymer mixture comprises, as a further constituent, an agent of the core-shell type to improve the notched impact strength having a core of polybutadiene and a shell of methyl methacrylate and styrene.

9. A method of improving the cosmetic properties of molded articles obtained from polymer mixtures of an aromatic polycarbonate and a polyalkylene terephthalate comprising adding cross-linked polymer particles having an average particle size of about 1 to about 30 microns to the mixture of aromatic polycarbonate and polyalkylene terephthalate, the cross-linked polymer comprising units derived from styrene or a styrene compound substituted in the ring, from one or more $C_4$-$C_8$ alkyl-(meth)acrylates and from a crosslinking agent, whereby flow lines and stripes in the molded articles are reduced.

10. The method of claim 9 wherein the cross-linked polymer particles are dispersed in a carrier polymer.

11. The method of claim 9 further comprising adding a flame-retardant to the mixture.

12. The method of claim 11 wherein the flame retardant is a copolymer of brominated bisphenol A, bisphenol and phosgene having a weight-averaged molecular weight of less than 3,000.

13. The method of claim 9 further comprising adding to the polymer mixture at least one of the additives selected from the group consisting of an agent to improve impact strength, a polyolefin, one or more stabilizers, dyes, pigments, reinforcing fibers, and a mold release agent.

14. The method of claim 9 wherein the polymer mixture comprises about 63-86 parts by weight aromatic polycarbonate, about 12-17 parts by weight polyalkylene terephthalate, and about 2-20 parts by weight of cross-linked polymer particles.

15. The method of claim 9 further comprising forming a melt of a mixture of the aromatic polycarbonate and polyalkylene terephthalate having the cross-linked polymer particles mixed therein and extruding the melt to form an article.

16. The improved article extruded from the melt of the polymer mixture of claim 15.

17. The method of claim 9 further comprising adding to the polymer mixture an agent of the core-shell type to improve the notched impact strength having a core of polybutadiene and a shell of methyl methacrylate and styrene.

* * * * *